United States Patent [19]

Lutz et al.

[11] Patent Number: 5,023,782
[45] Date of Patent: Jun. 11, 1991

[54] TRAVELERS CHEQUE TRANSACTION TERMINAL

[75] Inventors: William A. Lutz, Halesite; John B. Wright, Crestwood, both of N.Y.; Noel Moss, St. Louis, Mo.; Richard Delia, Brooklyn, N.Y.

[73] Assignee: MasterCard International Inc., New York, N.Y.

[21] Appl. No.: 499,617

[22] Filed: Mar. 26, 1990

[51] Int. Cl.⁵ .................... G06F 15/21; G06F 15/30
[52] U.S. Cl. .................... 364/405; 364/408; 235/379
[58] Field of Search .................... 364/405, 408; 382/7; 235/379, 380; 340/825.31, 825.34

[56] References Cited

U.S. PATENT DOCUMENTS

| | | | |
|---|---|---|---|
| 4,109,238 | 8/1978 | Creekmore | 340/825.33 |
| 4,187,498 | 2/1980 | Creekmore | 340/825.33 |
| 4,207,814 | 6/1980 | Schenk | 101/76 |
| 4,260,880 | 4/1981 | Thomas | 235/454 |
| 4,277,689 | 7/1981 | Thomas et al. | 382/7 |
| 4,603,232 | 7/1986 | Kurland et al. | 379/92 |
| 4,650,977 | 3/1987 | Couch | 235/379 |
| 4,672,377 | 6/1987 | Murphy et al. | 340/825.34 |
| 4,674,041 | 6/1987 | Lemon et al. | 364/401 |
| 4,758,714 | 7/1988 | Carlson et al. | 235/380 |
| 4,859,839 | 8/1989 | Tetelman et al. | 235/385 |

Primary Examiner—Jerry Smith
Assistant Examiner—David Huntley
Attorney, Agent, or Firm—Brumbaugh, Graves, Donohue & Raymond

[57] ABSTRACT

An electronic travelers cheque transaction terminal for use in a financial institution such as a bank for purposes of assisting in the sale, refund or encashment of travelers cheques, and used in combination with a host computer with which the terminal is connected by telephone communication lines and which provides authorization of travelers' cheque transactions, comprising a character recognition element for reading data from the travelers cheques being sold, encashed or refunded, and a control element including a control processing unit and a control program stored in memory. The program is used for controlling the verification of the status of the data, the receipt of authorization of the transaction upon verification of the data, and the storage of the data into another memory upon authorization of the transaction. The control further includes means for generating a "Buffer Full" signal when the storage of the second memory is at capacity.

5 Claims, 9 Drawing Sheets

TRAVELERS CHEQUE TRANSACTION TERMINAL

FIELD OF THE INVENTION

The present invention relates to commercial transaction terminals and particularly to an improved terminal capable of scanning, capturing and optimally utilizing pertinent data from commercial paper, and specifically travelers cheques.

BACKGROUND OF THE INVENTION

In the commercial banking industry, financial institutions often issue and sell travelers cheques to customers for their use as demand instruments or as orders for the payment of money throughout the world at participating merchants and financial institutions, including affiliates of the issuing bank. For example, MasterCard International Incorporated ("MasterCard") and its subsidiary operate a cooperative travelers cheque system on behalf of member banks whereby such banks may issue MasterCard travelers cheques to their own individual customers for use by these customers in making retail purchases throughout the United States and the world. Member banks also accept for deposit from their merchant customers the travelers cheques which are passed during a purchase transaction. MasterCard provides for the settlement of accounts between a bank that accepts a travelers cheque for deposit (the Acquiring bank) when the travelers cheque used for the purchase was issued by another bank (the Issuing bank).

In connection with the issuance and use of travelers cheques, a customer of a member bank typically purchases either a packet of travelers cheques or loose travelers cheques from that bank, which cheques are taken out of inventory by a teller and manually recorded by that teller for security purposes and for updating the bank's inventory. Banks also are called upon to pay customers cash upon the return of unused cheques ("encashment") and upon claims of lost or stolen cheques. Typically, prior to settlement of the refund for lost or stolen cheques, a security or authorization check is made by the bank whereby a host or central computer is consulted to verify that the lost or stolen claim is genuine.

Several different transaction devices are known and numerous techniques are used in the travelers cheque industry for performing a range of related tasks including (1) capturing sales data such as the number and monetary amount of travelers cheques sold; (2) transmitting such data to central locations for inventory update and control; (3) providing settlement data to central locations for settlement purposes; (4) authorizing encashment, i.e., return of unused verified travelers cheques; and (5) providing refunds upon verification of genuinely lost or stolen cheques. No one transaction travelers cheque terminal has included all of these functions in a dedicated communications and draft read and capture device as provided in the present invention.

Prior systems include magnetic and optical scanners which allow for integration at the teller or workstation level through standard communications interfaces. These devices do not include memory features which retain draft capture, encashment and refund information for later submission to a remote host; the data collected in these systems are sent immediately to a remote computer at the time the data is read by the scanner. Non-scanning systems also exist which include computer software packages for managing inventory, sales and refund requests of travelers cheques in foreign and domestic currencies.

Significantly, no terminal device presently includes an optical character recognition reader (OCR) and supports the following functions:
Travelers cheque sales by packet (PAF)
Loose travelers cheque sales
Encashment of travelers cheques
Refund of travelers cheques
Local review of captured data
Cancellation of PAF or loose cheque sales Accordingly, it is an objective of the present invention to provide a new and improved terminal for reading and capturing data from a travelers cheque for purposes of performing these various functions.

SUMMARY OF THE INVENTION

In accordance with the invention, an improved terminal includes an optical character recognition reader for reading travelers cheque data, memory facilities for storing captured data and a programmable read only memory programmed to perform data validation and utility functions including the review and organization of data regarding sales, refund and encashment of travelers cheques.

BRIEF DESCRIPTION OF THE DRAWINGS

The foregoing, and other objects, features, advantages of the invention will become more clearly understood from the following detailed description taken in conjunction with the accompanying drawings of which.

DETAILED DESCRIPTION OF THE DRAWINGS

While this invention is susceptible of embodiment in many different forms, there is described herein in detail one specific embodiment, with the understanding that the present disclosure is to be considered as an example of the principles of the invention and is not intended to limit the invention to the embodiment illustrated.

Figure 1:
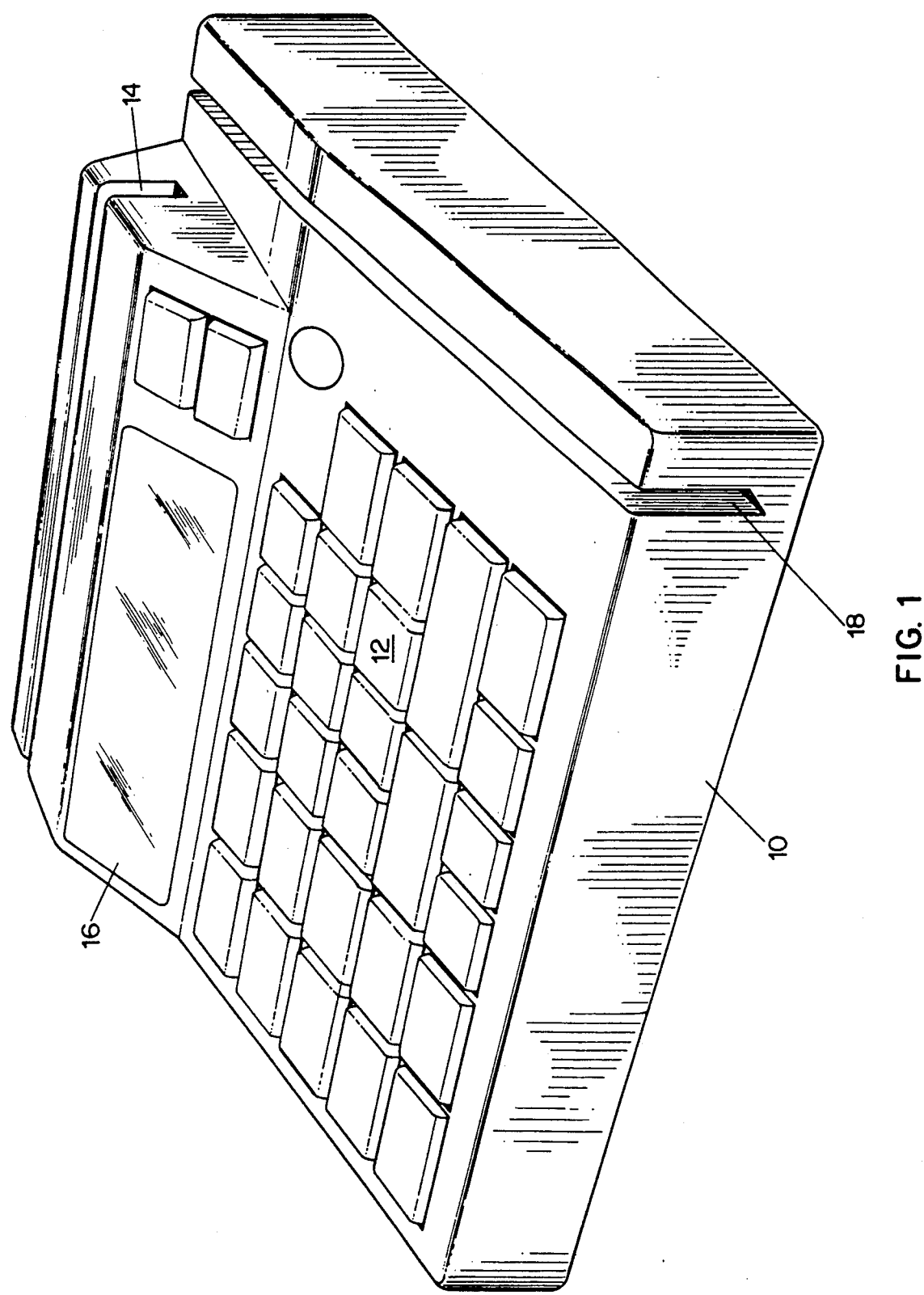
FIG. 1 is an overall pictorial view showing a disclosed embodiment of the present travelers cheque teller terminal.
Figure 2:
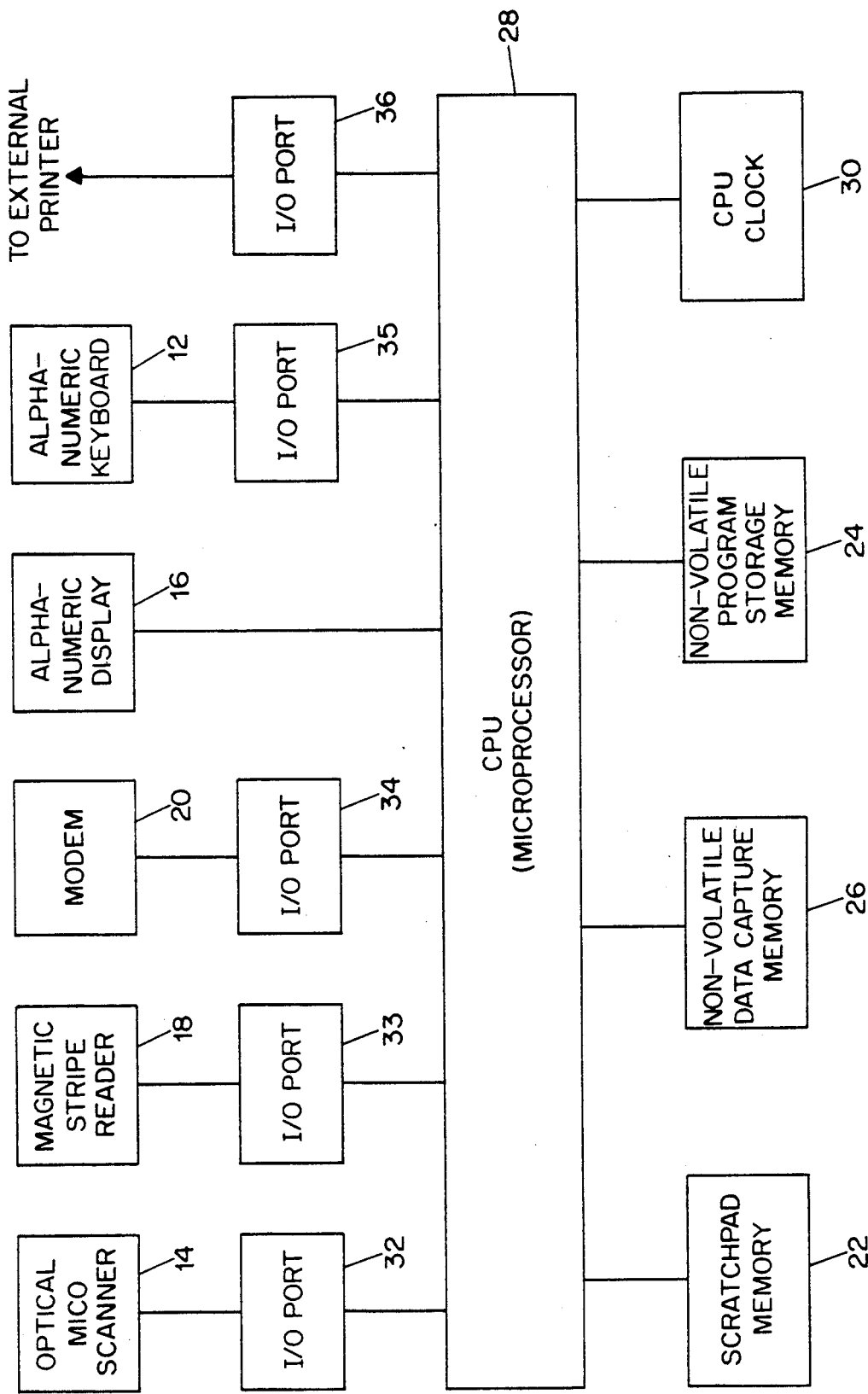
FIG. 2 is a functional block diagram for the hardware of the terminal of FIG. 1.

In the embodiment shown in FIGS. 1 and 2 the travelers cheque teller terminal according to the invention comprises a case 10, keyboard 12, optical character recognition reader 14, a display screen 16, and preferably a magnetic stripe reader 18 to support credit card and similar transactions. A modem 20 is also included.

The keyboard 12 is used for manual data input. It contains several special function keys, discussed below, for transaction selection and special terminal operations and keys for alphanumeric data input. The optical scanner 14 is the primary data input device for the terminal. It scans travelers cheques, PAF and similar documents that have coded lines standard in the industry. Briefly, the scanner performs a character recognition function and outputs the scanned data to the microprocessor, discussed below.

The terminal preferably includes three types of memory 22, 24, 26 with its central processing unit or microprocessor 28, which performs the terminal's program execution functions.

Scratchpad memory 22 is used by the CPU for storage of temporary variables and temporary workspace. It preferably is a conventional read/write volatile RAM. The program storage memory 24 provides a non-volatile means of storing the CPU instruction sequences that implement the terminal's algorithms (including character recognitions).

Data capture memory 26 is a non-volatile memory, which is used, in part, to store the following items:
- one or more terminal identification numbers
- one or more user security codes (passwords)
- one or more telephone numbers for communication with the host computer
- PAF sale transactions
- Loose cheque sale transactions The CPU clock 30 provides clocking signals for the CPU as well as providing a time base for timer functions. I/O ports 32–36 provide the interface between the terminal peripheral devices and the CPU's data, address and control buses. The actual I/O port type is dependent on the peripheral to which it is connected.

The terminal communicates with a host computer by use of telephone lines for purposes of inventory control and verification checks. The terminal identification number is used to identify the sender of any data sent to the host, and the user security code is entered and validated by the host before each transmitted transaction is allowed.

Operation of the terminal shall now be described with reference to the remaining FIGS. 3–6. After the conventional initialization steps are completed, the terminal is prepared to accept information relating to travelers cheque purchase, refund or encashment.

Figure 3B:
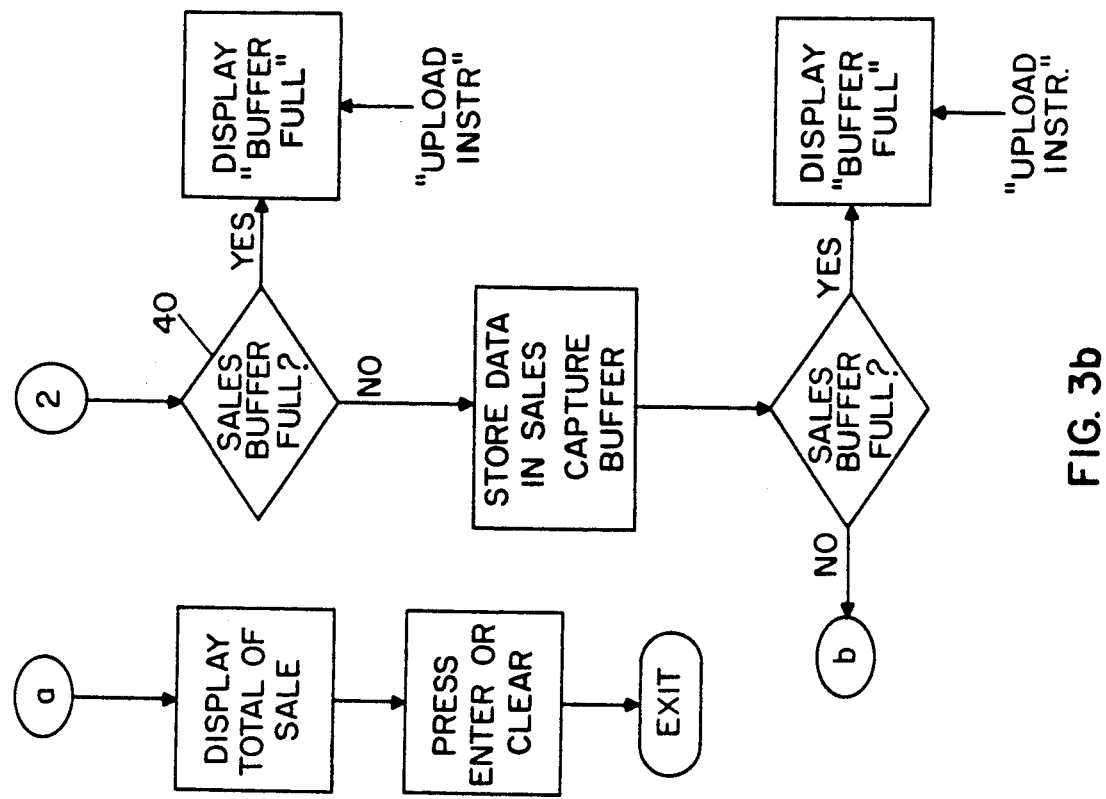
FIGS. 3a and 3b are flow charts representative of an exemplary program routine for controlling the sales capture process of the terminal of FIG. 1.
Figure 3A:
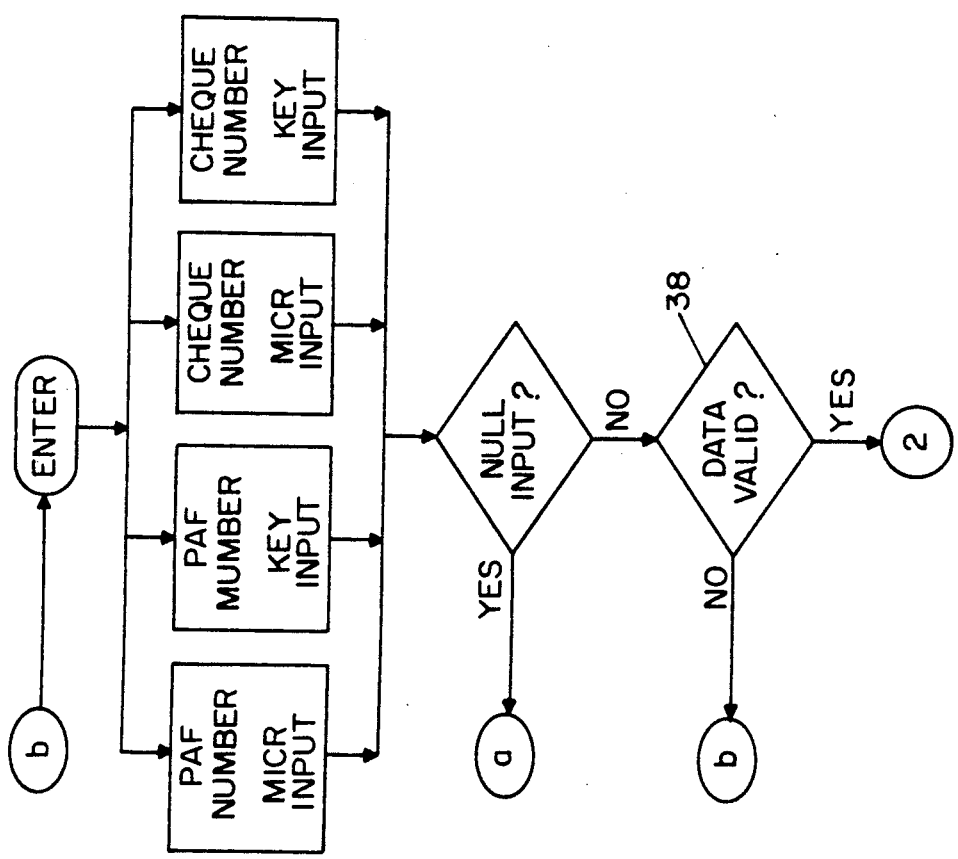
Figure 4B:
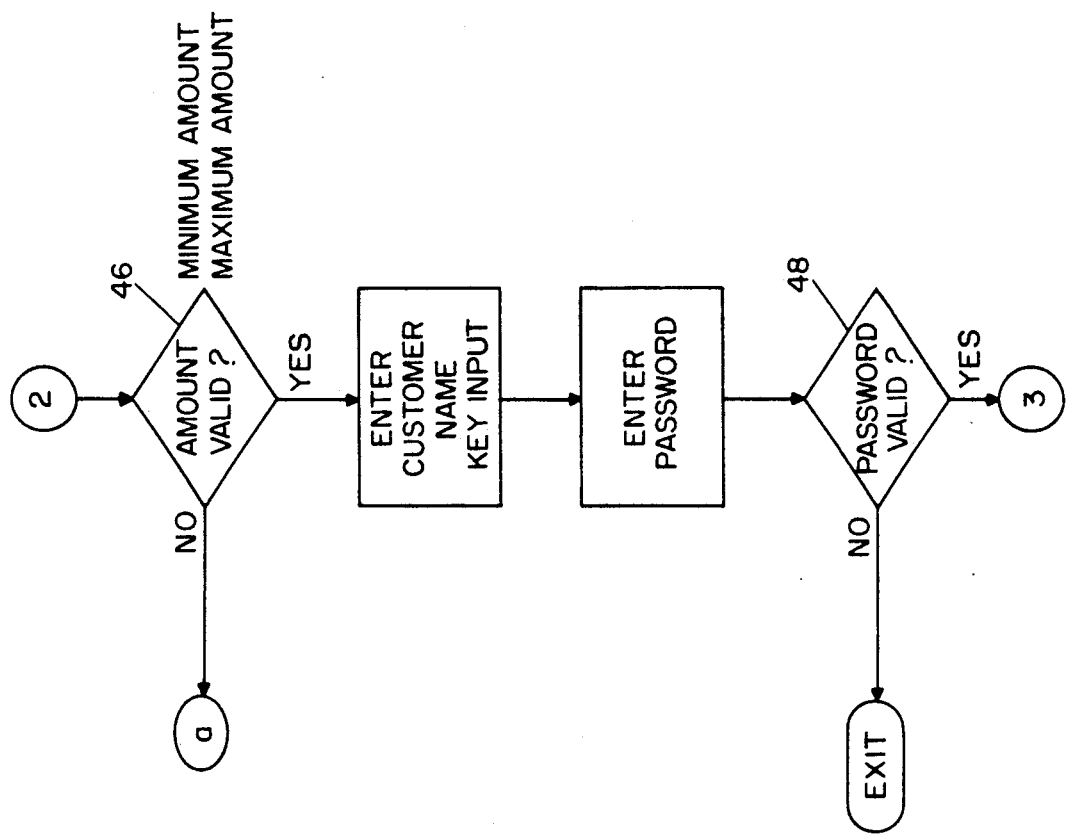
FIGS. 4a, 4b, 4c and 4d are flow charts representative of an exemplary program routine for controlling the refund process of the terminal of FIG. 1.
Figure 4A:
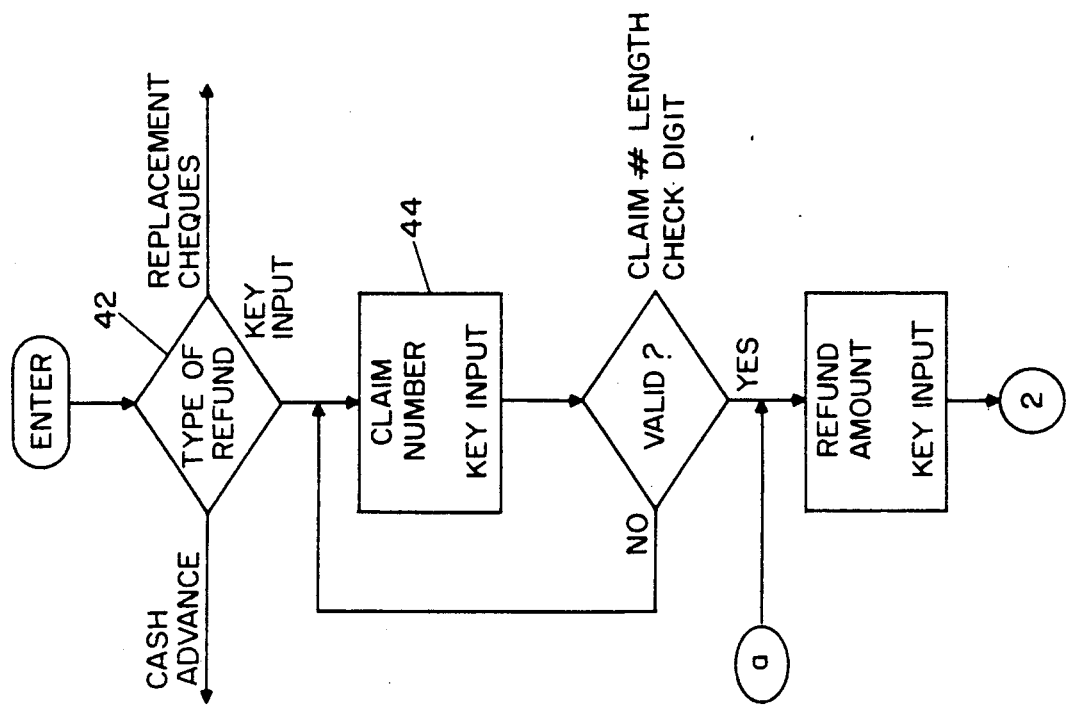
Figure 4C:
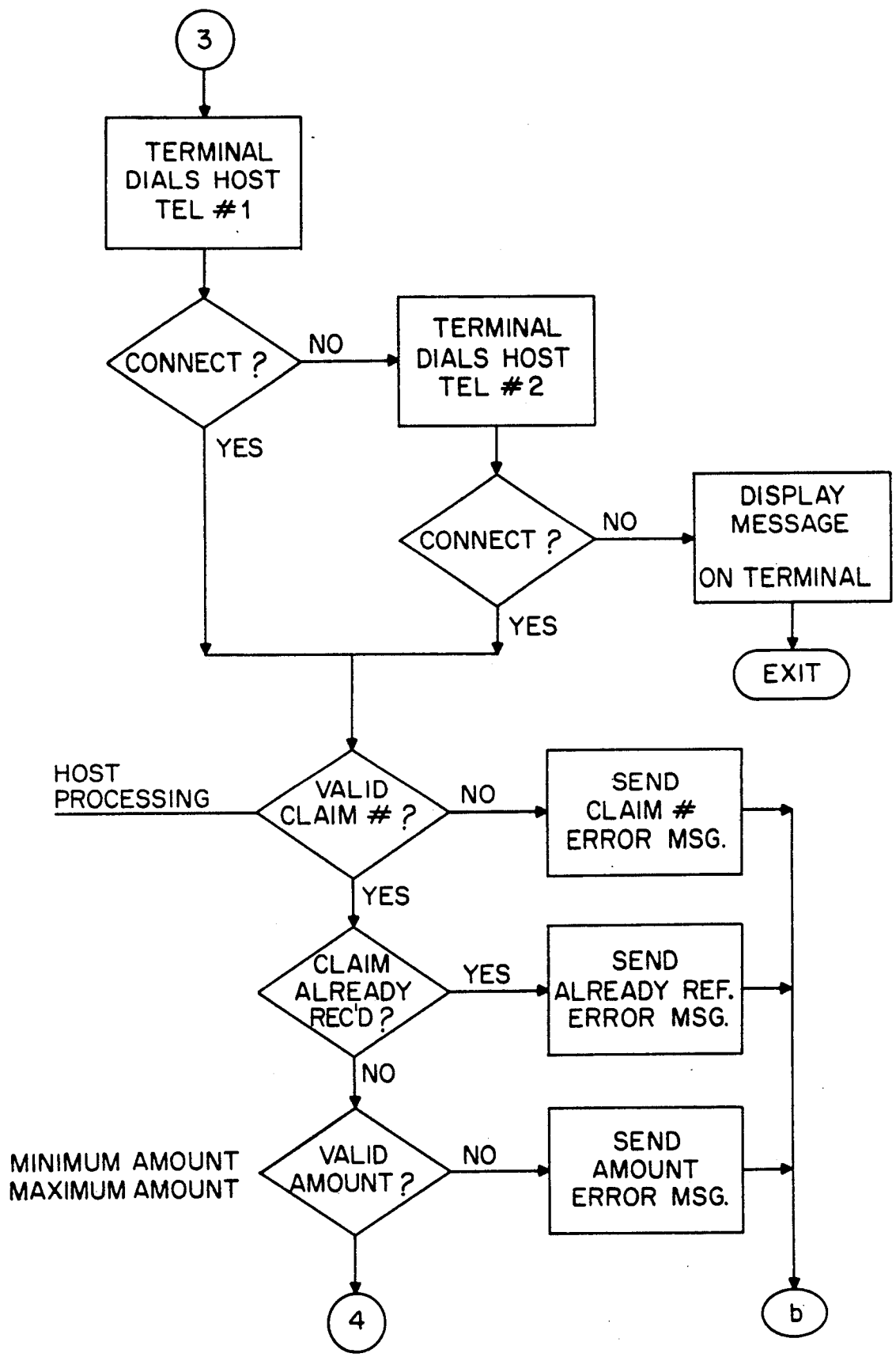

As shown in FIG. 3a, the terminal supports two modes of data entry. Manual entry is capable through the keyboard 12 and optical data entry is performed by "swiping" a MICR encoded PAF or travelers cheque through the OCR reader slot 14 on top of the terminal. The document direction may be either right-to-left or left-to-right. On completion of the entry of a batch of PAFs or loose travelers cheques, the total batch amount is displayed at display 16.

All entered data is subjected to a sanity or a verification check prior to acceptance by the terminal logic. As shown at block 38, if the MICR data fails any of these tests, the terminal re-prompts for the data. The terminal provides the following data validation functions:
- a length test
- a check digit test
- a PAF cheque quantity test
- a duplicate entry test With regard to the "length" test, all numeric MICR data and refund claim number data have an established length, and are tested to ensure that the proper length of the data has been read. Special MICR characters such as "on-us" and "routing and transit" are ignored. If the test fails, the terminal reports back with a "re-enter" message.

Regarding the "check digit" test, all numeric MICR data and refund claim number data have an embedded check digit, which is detected, i.e., the MICR encoded check digit must match the terminal calculated check digit. If the test fails, the terminal again reports back with a "re-enter" message.

As for the "PAF cheque quantity test", the number of cheques packaged with a PAF is encoded in the MICR data, and must match a reference table residing in the terminal. If the test fails, the terminal reports back with another "re-enter" message.

All entered MICR data is checked against the capture buffers. There are two capture buffers within data capture memory 26 which are used to temporarily store the information used for a particular transaction; one buffer houses the PAF sales data and the other houses the cheque sales data.

As shown at block 40 in FIG. 3b, if one of the buffers is full, the terminal reports back with a message "Buffer Full" and the contents of the buffer, i.e., the serial numbers and denominations of the cheques sold, should be uploaded to the host computer, as described in more detail below. If the contents of the buffer are not uploaded to the host, the sales will not be recorded by the terminal.

UTILITY FUNCTIONS

The programmable read only memory 24 controls the operation of the terminal and specifically the following utility functions, described below:
- Purging data in the buffers
- Reviewing PAF sales data by PAF MICR number
- Reviewing PAF sales totals by denomination
- Reviewing loose cheque sales data by cheque MICR number
- Reviewing loose cheque sales totals by denomination
- Cancelling the previous captured PAF sale
- Cancelling previous captured loose cheque sale The "Purge Data Buffer" function may be used to clear and initialize the terminal's internal data capture buffers prior to uploading the stored information to the host. This function is typically used when incorrect information is entered into the buffer. The "Review PAF Data" function enables the user to visually inspect the MICR data that has been captured from the PAFs, and the "PAF Sales Totals" function enables the user to visually review the dollar amount of PAF sales by cheque denomination. The "Cancel PAF Sale" function permits the user to delete a previously captured PAF based travelers cheque sale from the terminal's capture buffer. When a PAF sale is canceled, the PAF entry is removed from the capture buffer and the PAF based cheque sales totals are adjusted to reflect the cancellation. The "PAF based travelers cheque sale" function allows the user to sell a batch of one or more of travelers cheque packets. At the conclusion of the sale, the batch total is available to the user.

The "Review Loose Cheque Data" function enables the user to visually inspect the MICR data that has been captured from the loose cheques, and the "Loose Cheque Sales Totals" function enables the user to visually review the dollar amount of loose cheque sales by cheque denomination. The "Cancel Loose Cheque Sale" function permits the user to delete a previously captured loose cheque based sale from the terminal's capture buffer. When a loose cheque sale is canceled, the loose cheque entry is removed from the capture buffer and the loose cheque based sales totals are adjusted to reflect the cancellation. The "loose cheque based travelers cheque sale" function allows the user to sell a batch of one or more loose travelers cheques. At the conclusion of the sale, the batch total is available to the user.

REFUND LOST/STOLEN CHEQUES VALIDATION

The "refund lost/stolen cheques validation" function enables the teller to validate a refund claim. After entering pertinent information, the terminal will automatically dial the travelers cheque host to validate the refund claim. Upon completion of refund process, the teller presses a key which causes the terminal to transmit a code, confirming to the host that the refund was given.

Specifically, as shown in FIGS. 4a-4d, the refund process is as follows. The terminal operator, i.e., teller, keys in at block 42 the type of refund to be given to a customer to replace a lost or stolen travelers cheque. The refund can be given in cash or in replacement cheques. At block 44, the claim number is input into the terminal and verified by performance of a "length" test and "digit" test. If these tests are successful, a refund amount is punched into the system, and if the refund amount is valid (block 46), the customer's name and terminal operator's password is keyed in and checked (block 48). Using the telephone numbers stored in the non-volatile memory 26, the terminal dials the host computer for processing and authorization of the claim. The terminal supports one or more attempts to dial a host. Each attempt may dial a different telephone number.

The terminal displays appropriate messages during the communications process. These messages include:
DIALING
RE-DIALING
WAIT FOR ANSWER
NO HOST ANSWER
SENDING
RE-SENDING
PLEASE RE-TRY
RECEIVING If the terminal is unable to reach the host the appropriate message is displayed. If connection is made, the processing and authorization at the host checks the claim number, name and amount and verifies that the claim has not previously been made. If not previously made, the authorization is transmitted and the claim is then flagged as refunded for purposes of future requests.

ENCASH TRAVELERS CHEQUES

The "encash travelers cheque" function enables a user to validate a batch of travelers cheques presented for encashment against a negative file of lost and stolen cheques.

Figure 5A:
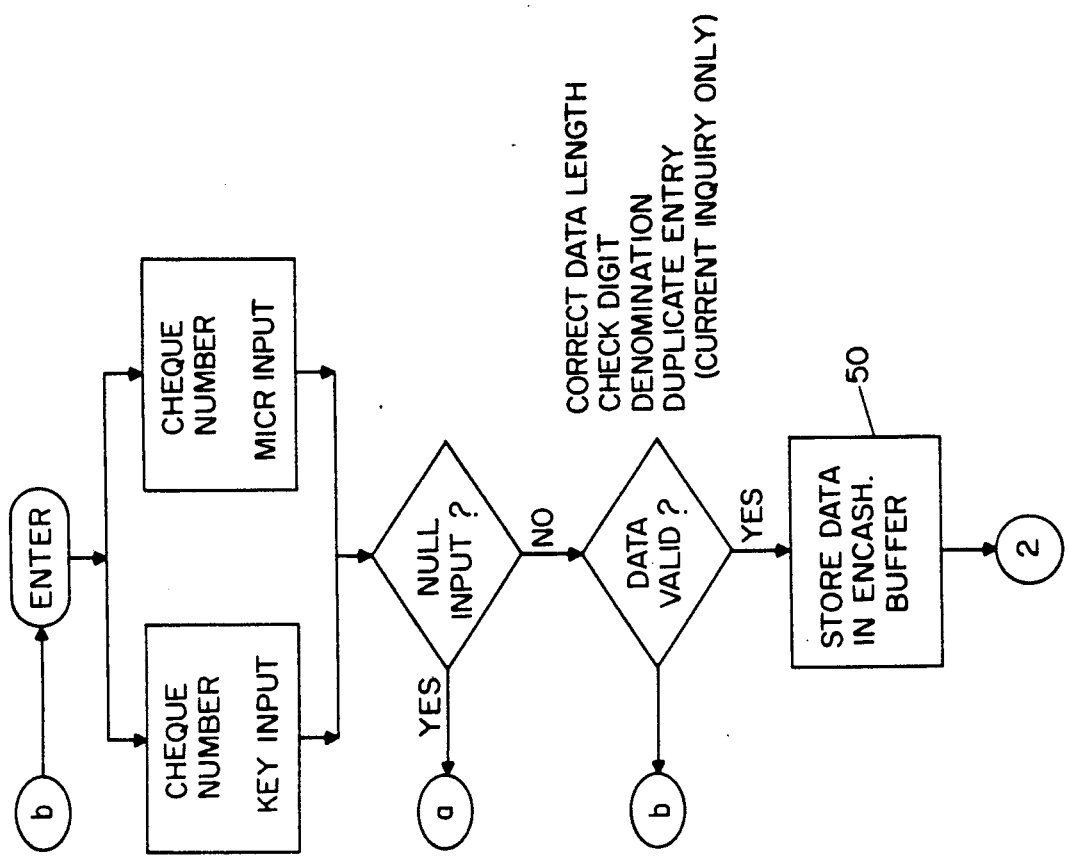
FIGS. 5a, 5b and 5c are flow charts representative of an exemplary program routine for controlling the encashment inquiry process of the terminal of FIG. 1.
Figure 4D:
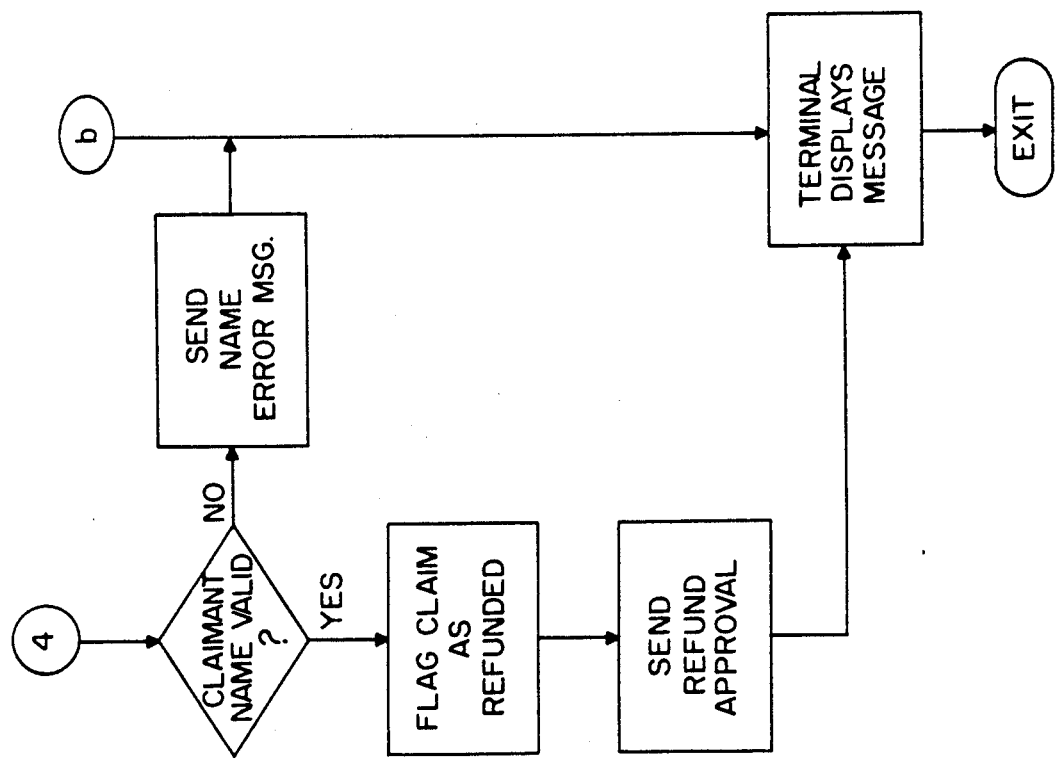
Figure 5B:
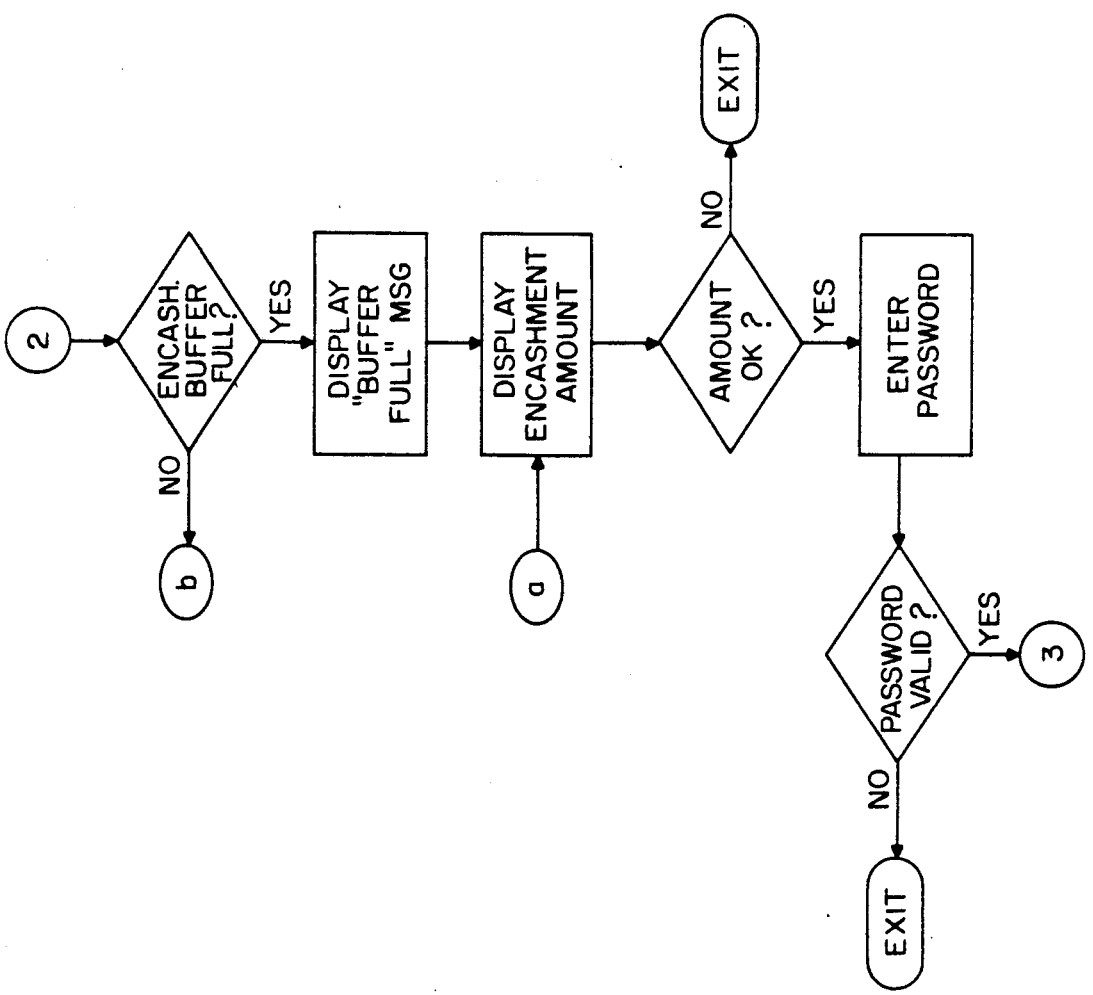
Figure 5C:
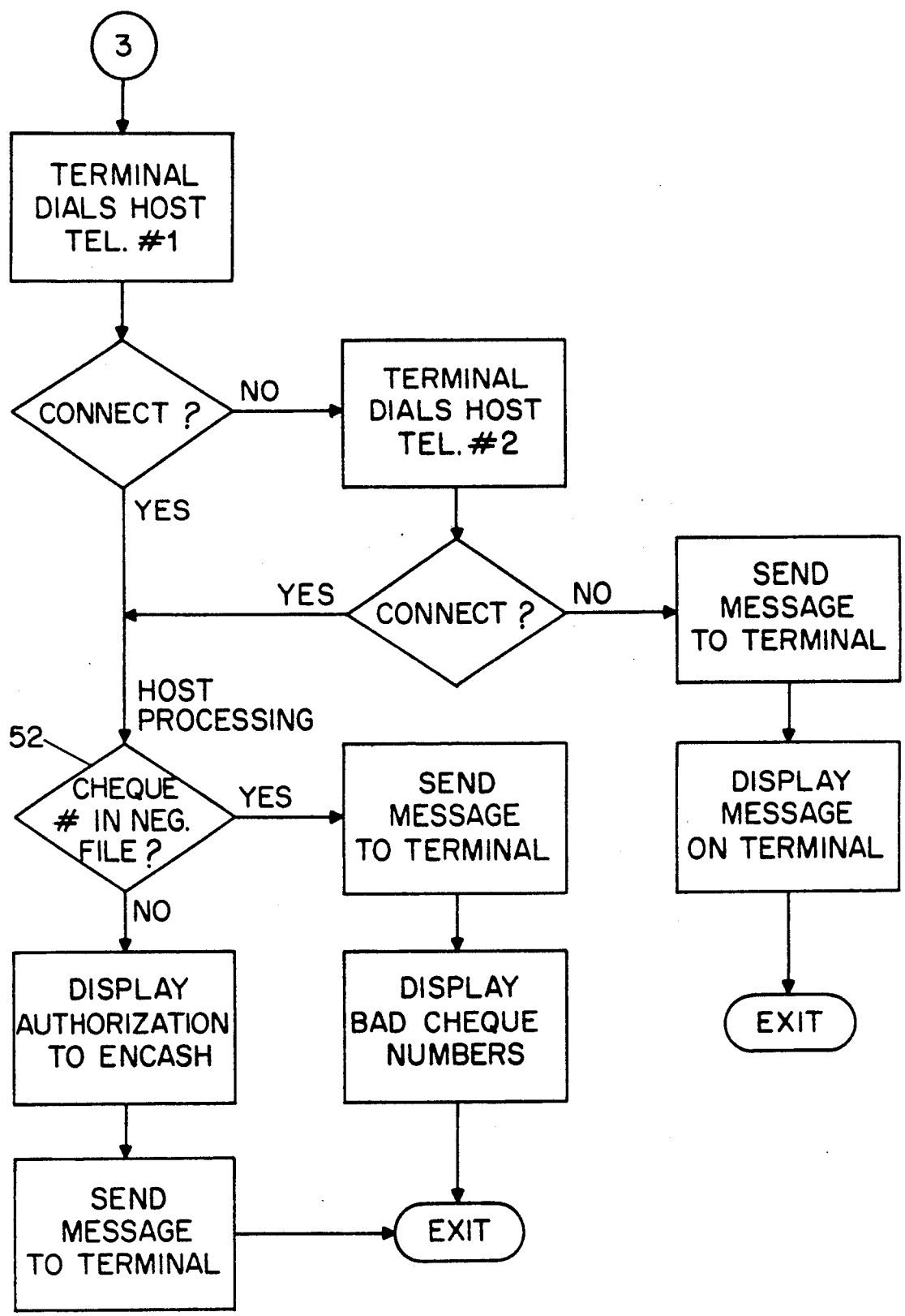

Referring to FIGS. 5a, 5b and 5c encashment may take place as follows. The teller scans the travelers cheque into the terminal and the input and data are checked in accordance with the tests outlined above. If the data is valid it is stored in the encashment buffer (block 50). If the buffer is full then the appropriate message is displayed. If not, the amount of encashment is checked, and upon entry of the proper password, communication is made with the host for authorization. If the cheque number is not in the bad cheque number list (block 52) then authorization is granted by the host and encashment may be made to the customer.

UPLOADING THE CAPTURE BUFFERS

As discussed above, the terminal's capture buffers must be uploaded to the host computer when they are full and can be uploaded at any time. When either the PAF capture buffer or the loose cheque capture buffer are full, the terminal will display a message to alert the user that the buffer should be uploaded to the host. Because the terminal maintains separate PAF and loose cheque buffers, if only one of the buffers is full, the terminal can still continue to capture data in the other buffer. For example, if the PAF buffer is full, i.e., at capacity, but the loose cheque buffer still has room, the terminal will refuse to record additional PAF transactions but will continue to record loose cheque transactions. The cheque encashment and refund validation functions are not dependent on the state of the PAF and loose cheque capture buffers, and thus will continue to operate normally.

Figure 6A:
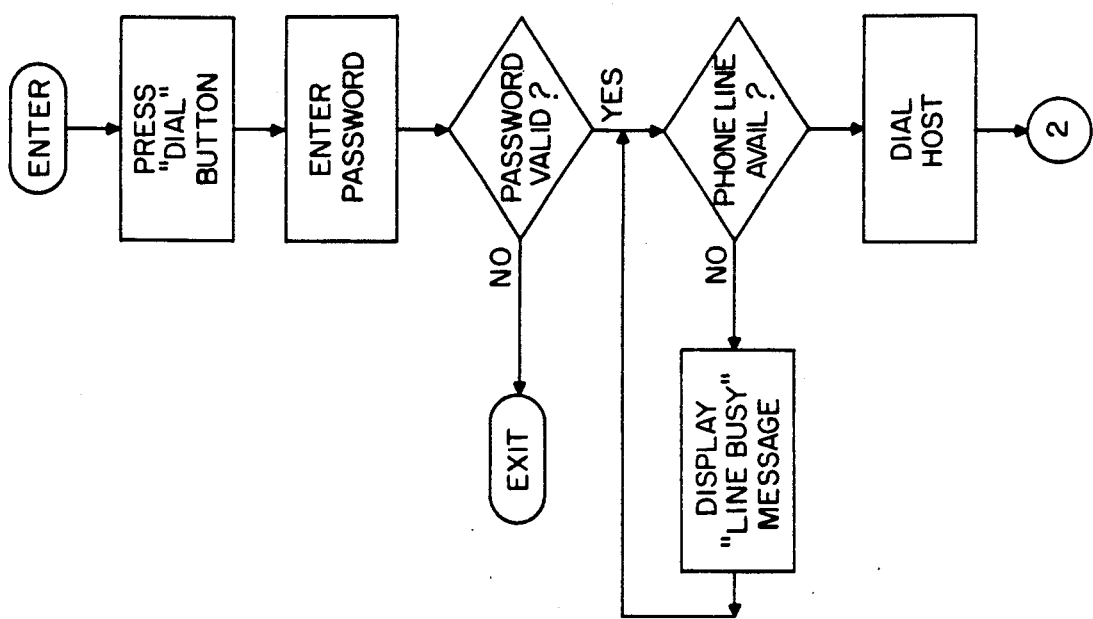
FIGS. 6a and 6b are flow charts representative of an exemplary program routine for uploading the host computer with sales data from the terminal of FIG. 1.
Figure 6B:
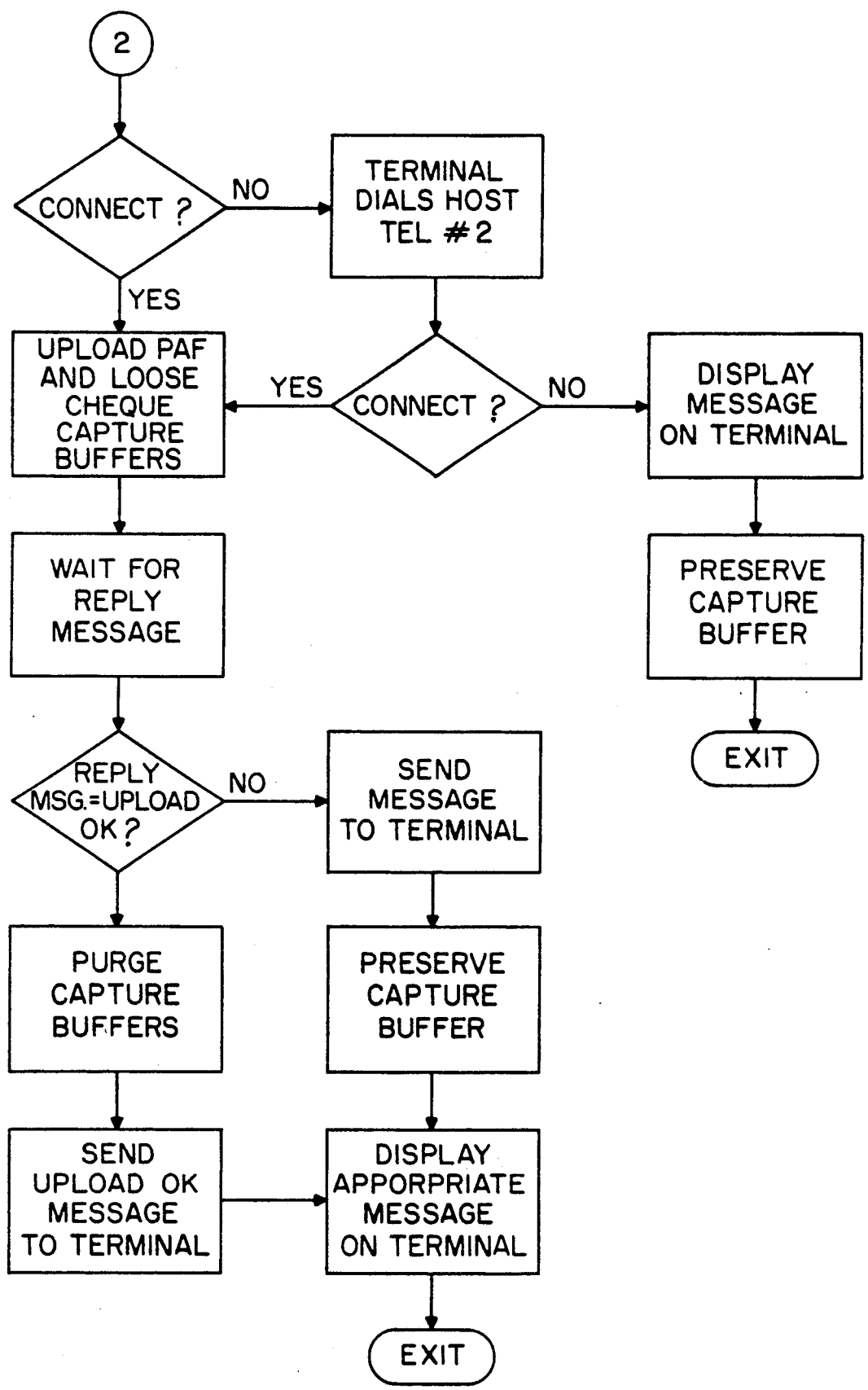

Referring to FIGS. 6a and 6b, the process for uploading the host is as follows. The teller dials the host by pressing the "Dial" key on the keyboard and entering the appropriate password. Upon telephone connection the teller uploads the PAF and loose cheque capture buffers by typing the appropriate instructions. The host responds if the upload process was successful or if it failed. The proper message is then displayed. If the uploaded process was successful, the contents of the PAF and loose cheque buffers are automatically purged. If the upload process failed, the contents of the PAF and loose cheque buffers are preserved.

We claim:

1. An electronic travelers cheque transaction terminal for use in a financial institution such as a bank for purposes of assisting in the sale, refund or encashment of travelers cheques, and used in combination with a host computer with which said terminal is connected by telephone communication lines and which provides authorization of travelers cheque transactions, comprising:

optical character recognition means for reading data from said travelers cheques being sold, encashed or refunded;

control means including a control processing unit and a control program stored in a first memory means for controlling verification of the status of said data, the receipt of authorization of the transaction upon verification of the data, and the storage of said data into second memory means upon authorization of the transaction, said control means further including means for generating a first signal when the storage of said second memory means is at capacity; and wherein said second memory means includes two parts, the first of which stores data read from individual travelers' cheques and the second of which stores data from packaged travelers' cheques, and wherein said means for generating said first signal generates said signal when the storage of either of said parts is at capacity;

wherein said control program further controls the transmission of the contents of each of said parts of second memory means to said host computer; and wherein said travelers cheque data is of predetermined length and includes a key check digit and said travelers cheques are sold in packages of a predetermined quantity, and wherein said second memory means has stored information representative of the predetermined length of the data to be read from said travelers cheque, the key digit and said predetermined quantity, and wherein said control program for controlling the verification of the status of said data includes means for performing a first verification test of the length of said data read by the optical character recognition means, means for performing a second verification test of the key check digit, and means for performing a third verification test of the predetermined quantity of travelers cheques sold, said tests comprising a comparison of the data read and stored information, whereby said control means generates a verification signal in the event the data read and the stored information match, and a rejection signal in the event the read and the stored information do not match.

2. The terminal of claim 1, wherein said control means further includes means for generating a second signal upon authorization of the transaction, said terminal further including visual display means for displaying messages corresponding to said verification, rejection, and first and second signals.

3. The terminal of claim 2, wherein said control means includes means for purging said data stored in the second memory means.

4. The terminal of claim 3, further comprising means for causing the display of said data read from said recognition means.

5. The terminal of claim 4, wherein said terminal further includes data entry means for entering information corresponding to the sale, refund or encashment of said travelers cheques.

* * * * *

UNITED STATES PATENT AND TRADEMARK OFFICE
CERTIFICATE OF CORRECTION

PATENT NO. : 5,023,782
DATED : June 11, 1991
INVENTOR(S) : Lutz et al.

It is certified that error appears in the above-identified patent and that said Letters Patent is hereby corrected as shown below:

Column 8, line 1, "read" should be -- data read --.

Signed and Sealed this

Twenty-ninth Day of December, 1992

Attest:

DOUGLAS B. COMER

*Attesting Officer*     *Acting Commissioner of Patents and Trademarks*